(12) United States Patent
Trager et al.

(10) Patent No.: US 11,603,153 B1
(45) Date of Patent: Mar. 14, 2023

(54) BICYCLE SADDLE WITH SUPER ELASTIC MATERIAL MEMBER ACTIVATED VIBRATION ISOLATION

(71) Applicant: Toyota Motor Engineering & Manufacturing North America, Inc., Plano, TX (US)

(72) Inventors: Christian Arthur Trager, Canton, MI (US); Paul A. Gilmore, Ann Arbor, MI (US); Umesh N. Gandhi, Farmington Hills, MI (US); Ryohei Tsuruta, Ann Arbor, MI (US); Michael Paul Rowe, Pinckney, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/571,940

(22) Filed: Jan. 10, 2022

(51) Int. Cl.
| *F16F 15/12* | (2006.01) |
| *B62J 1/06* | (2006.01) |
| *B62J 1/08* | (2006.01) |
| *F16F 1/379* | (2006.01) |
| *F16F 1/02* | (2006.01) |

(52) U.S. Cl.
CPC ............. *B62J 1/065* (2013.01); *B62J 1/08* (2013.01); *F16F 1/02* (2013.01); *F16F 1/379* (2013.01); *F16F 15/12* (2013.01); *F16F 2224/0258* (2013.01); *F16F 2230/08* (2013.01); *F16F 2230/18* (2013.01)

(58) Field of Classification Search
CPC ...... B62J 1/065; B62J 1/08; F16F 1/02; F16F 1/379; F16F 15/12; F16F 2224/0258; F16F 2230/08; F16F 2230/18
See application file for complete search history.

(56) References Cited

U.S. PATENT DOCUMENTS

| 82,276 | A | 9/1868 | Belleville |
| 1,826,597 | A | 10/1931 | Brecht |
| 2,121,835 | A | 6/1938 | Sproul |
| 2,655,935 | A | 10/1953 | Kinzbachs |
| 2,753,177 | A | 7/1956 | Boyd |
| 2,973,015 | A | 2/1961 | Thompson |

(Continued)

FOREIGN PATENT DOCUMENTS

| CN | 202811955 U | 3/2013 |
| CN | 103899704 B | 11/2015 |

(Continued)

OTHER PUBLICATIONS

U.S. Appl. No. 17/156,041, filed Jan. 22, 2021.

(Continued)

*Primary Examiner* — Xuan Lan Nguyen
(74) *Attorney, Agent, or Firm* — Christopher G. Darrow; Darrow Mustafa PC

(57) ABSTRACT

A vibration isolator can be configured to provide improved vibration isolation performance, such as in connection with a bicycle saddle. A vibration isolator can be operatively connected to a bicycle saddle. The vibration isolator can be configured to exhibit a non-linear stiffness profile. The non-linear stiffness profile can include a region of quasi-zero stiffness. The vibration isolator can include one or more movable body members and one or more super elastic material members.

22 Claims, 6 Drawing Sheets

(56) References Cited

U.S. PATENT DOCUMENTS

| | | | |
|---|---|---|---|
| 2,991,655 A | 7/1961 | Jorgensen et al. | |
| 3,080,160 A | 3/1963 | Omer | |
| 3,366,082 A | 1/1968 | Ross | |
| 3,394,631 A | 7/1968 | Thompson | |
| 3,430,942 A | 3/1969 | Webb et al. | |
| 3,559,512 A | 2/1971 | Aggarwal | |
| 3,574,347 A | 4/1971 | Hughes | |
| 3,608,883 A | 9/1971 | Russold et al. | |
| 3,743,266 A | 7/1973 | Sturman et al. | |
| 3,836,195 A | 9/1974 | Teeri | |
| 3,856,242 A | 12/1974 | Cook | |
| 3,858,665 A | 1/1975 | Winker | |
| 3,873,079 A | 3/1975 | Kuus | |
| 3,980,016 A | 9/1976 | Taylor | |
| 4,168,101 A | 9/1979 | DiGrande | |
| 4,215,841 A | 8/1980 | Herring, Jr. | |
| 4,351,556 A | 9/1982 | Worringer | |
| 4,457,213 A | 7/1984 | Morgan | |
| 4,530,491 A | 7/1985 | Bucksbee et al. | |
| 4,612,429 A | 9/1986 | Milianowicz | |
| 4,779,852 A | 10/1988 | Wassell | |
| 4,799,654 A | 1/1989 | Eickmann | |
| 4,824,338 A | 4/1989 | Eickmann | |
| 4,850,643 A | 7/1989 | Rollman | |
| 5,178,357 A | 1/1993 | Platus | |
| 5,222,709 A | 6/1993 | Culley, Jr. et al. | |
| 5,263,694 A | 11/1993 | Smith et al. | |
| 5,301,974 A | 4/1994 | Knapp | |
| 5,310,157 A | 5/1994 | Platus | |
| 5,390,903 A | 2/1995 | Fidziukiewicz | |
| 5,489,139 A * | 2/1996 | McFarland | B62J 1/04 280/283 |
| 5,669,594 A | 9/1997 | Piatus et al. | |
| 5,669,598 A | 9/1997 | Ticey et al. | |
| 6,007,148 A | 12/1999 | Yu | |
| 6,089,656 A * | 7/2000 | Hals | B62J 1/04 297/211 |
| 6,270,065 B1 * | 8/2001 | Hals | B62J 1/04 267/132 |
| 6,354,556 B1 | 3/2002 | Ritchie et al. | |
| 6,371,463 B1 * | 4/2002 | Sorovshian | C22F 1/006 310/239 |
| 6,443,524 B1 | 9/2002 | Yu | |
| 6,530,564 B1 * | 3/2003 | Julien | A43B 13/186 267/80 |
| 6,935,693 B2 | 8/2005 | Janscha et al. | |
| 6,939,097 B2 | 9/2005 | Carr et al. | |
| 7,152,839 B2 | 12/2006 | Mullinix et al. | |
| 7,822,522 B2 | 10/2010 | Wereley et al. | |
| 7,854,425 B2 | 12/2010 | Evans | |
| 7,874,576 B2 * | 1/2011 | Gandhi | B60R 21/203 280/728.2 |
| 8,053,068 B2 * | 11/2011 | Fanucci | F16F 15/04 428/293.1 |
| 8,166,626 B2 | 5/2012 | Sereni et al. | |
| 8,185,988 B2 | 5/2012 | Wieland | |
| 8,366,082 B2 | 2/2013 | Evans | |
| 8,500,108 B2 | 8/2013 | Rode | |
| 8,585,026 B2 | 11/2013 | Dittmar | |
| 8,919,751 B2 | 12/2014 | Kneidel | |
| 9,194,452 B2 | 11/2015 | Hawkins et al. | |
| 9,394,950 B1 | 7/2016 | Henry et al. | |
| 9,408,428 B2 | 8/2016 | Gaudet | |
| 9,950,760 B2 * | 4/2018 | Ahnert | B62J 1/04 |
| 9,957,007 B2 | 5/2018 | Bigolin | |
| 10,371,229 B2 | 8/2019 | Gandhi et al. | |
| 10,532,672 B1 * | 1/2020 | Pinkelman | B60N 2/542 |
| 10,677,310 B2 | 6/2020 | Gandhi et al. | |
| 11,137,045 B2 | 10/2021 | Gandhi et al. | |
| 11,338,711 B1 | 5/2022 | Gilmore et al. | |
| 2004/0245830 A1 | 12/2004 | Scheck et al. | |
| 2007/0138720 A1 | 6/2007 | Evans | |
| 2009/0025833 A1 * | 1/2009 | Schussler | F16F 1/021 267/136 |
| 2009/0226691 A1 | 9/2009 | Mankame et al. | |
| 2012/0018577 A1 | 1/2012 | Quiroz-Hernandez | |
| 2014/0265468 A1 | 9/2014 | Greenhill et al. | |
| 2015/0298580 A1 | 10/2015 | Kanai | |
| 2016/0009156 A1 | 1/2016 | Leonard et al. | |
| 2016/0068085 A1 | 3/2016 | Mindel et al. | |
| 2018/0195570 A1 | 7/2018 | Churchill et al. | |
| 2018/0195571 A1 | 7/2018 | Churchill et al. | |
| 2018/0312086 A1 | 11/2018 | Meingast et al. | |
| 2019/0186587 A1 | 6/2019 | Gandhi et al. | |
| 2019/0186588 A1 | 6/2019 | Gandhi et al. | |
| 2019/0186589 A1 | 6/2019 | Gandhi et al. | |
| 2020/0238781 A1 * | 7/2020 | Hadi | B60G 17/016 |
| 2020/0298732 A1 * | 9/2020 | Gandhi | B60N 2/502 |
| 2020/0393013 A1 | 12/2020 | Schneider | |
| 2022/0144152 A1 | 5/2022 | Gilmore et al. | |
| 2022/0145957 A1 | 5/2022 | Gilmore et al. | |
| 2022/0145958 A1 | 5/2022 | Gilmore et al. | |
| 2022/0153370 A1 | 5/2022 | Gilmore et al. | |

FOREIGN PATENT DOCUMENTS

| | | |
|---|---|---|
| CN | 105408192 A | 3/2016 |
| CN | 114033062 A | 2/2022 |
| JP | 2011201378 A | 10/2011 |
| KR | 102106610 B1 | 5/2020 |
| TW | M612680 U | 6/2021 |
| WO | 2009027681 A1 | 3/2009 |

OTHER PUBLICATIONS

Panagiotopoulos et al., "Advanced ultra-light multifunctional metallic-glass wave springs", Materials and Design, 2020, (10 pages).

Spaggiari et al., "Multiphysics Modelling and Design of Shape Memory Alloy Wave Springs as Linear Actuators", Proceedings of the ASME 2010 Conference on Smart Materials, Adaptive Structures and Intelligent Systems, Sep. 28-Oct. 1, 2010, Philadelphia, PA (9 pages).

Li et al., "A highly adjustable magnetorheological elastomer base isolator for real-time adaptive control", Smart Materials and Structures, Aug. 2013 (25 pages).

Carella et al., "Demonstrator to show the effects of negative stiffness on the natural frequency of a simple oscillator", MES (2008) Proceedings of the Institution of Mechanical Engineers, Part C: Journal of Mechanical Engineering Science, vol. 222 (7), pp. 1189-1192 (4 pages).

Le, Thanh Dahn et al., "Experimental investigation of a vibration isolation system using negative stiffness structure", International Journal of Mechanical Sciences (2013) International Journal of Mechanical Sciences 170 (2013) 99-112 (14 pages).

Lee, Thanh Danh et al., "A vibration isolation system in low frequency excitation region using negative stiffness structure for vehicle seat", Journal of Sound and Vibration 330 ( 2011) 6311-6335 (25 pages).

Lee, C.M. et al., "A multi-stage high-speed railroad vibration isolation system with "negative" stiffness", Journal of Sound and Vibration 331 (2012) 914-921 (8 pages).

Lee, et al., "Position control of seat suspension with minimum stiffness," Journal of Sound and Vibration 292 (2006) 435-442 (8 pages).

"Belleville Springs." encyclopedia of Vibration, 2001. (Year: 2001).

U.S. Appl. No. 17/571,951.
U.S. Appl. No. 17/571,969.
U.S. Appl. No. 17/205,991.
U.S. Appl. No. 17/205,944.
U.S. Appl. No. 17/156,135.
U.S. Appl. No. 17/156,185.

* cited by examiner

BICYCLE SADDLE WITH SUPER ELASTIC MATERIAL MEMBER ACTIVATED VIBRATION ISOLATION

FIELD

The subject matter described herein relates in general to saddles and, more particularly, to bicycle saddles.

BACKGROUND

A bicycle saddle, typically referred to as a bicycle seat, is designed to support a portion of a rider's body. The height of the saddle is often adjustable. The saddle can be made in various shapes and sizes. The saddle can be configured to provide some amount comfort for the rider, such as by including padding.

SUMMARY

In one respect, the present disclosure is directed to a system for vibration isolation of a bicycle saddle. The system includes a bicycle saddle. The system further includes a vibration isolator operatively connected to the bicycle saddle. The vibration isolator can be configured to exhibit a non-linear stiffness profile. The non-linear stiffness profile can include a region of quasi-zero stiffness. The vibration isolator can include one or more movable body members and one or more super elastic material members.

In another respect, the present disclosure is directed to a vibration isolator. The vibration isolator can include a four-bar linkage. The vibration isolator can include one or more super elastic material members operatively connected to the four-bar linkage. The one or more super elastic material members can be configured to exhibit a non-linear stiffness profile. The non-linear stiffness profile can include a region of quasi-zero stiffness. The non-linear stiffness profile can be selectively variable.

DETAILED DESCRIPTION

Figure 1:
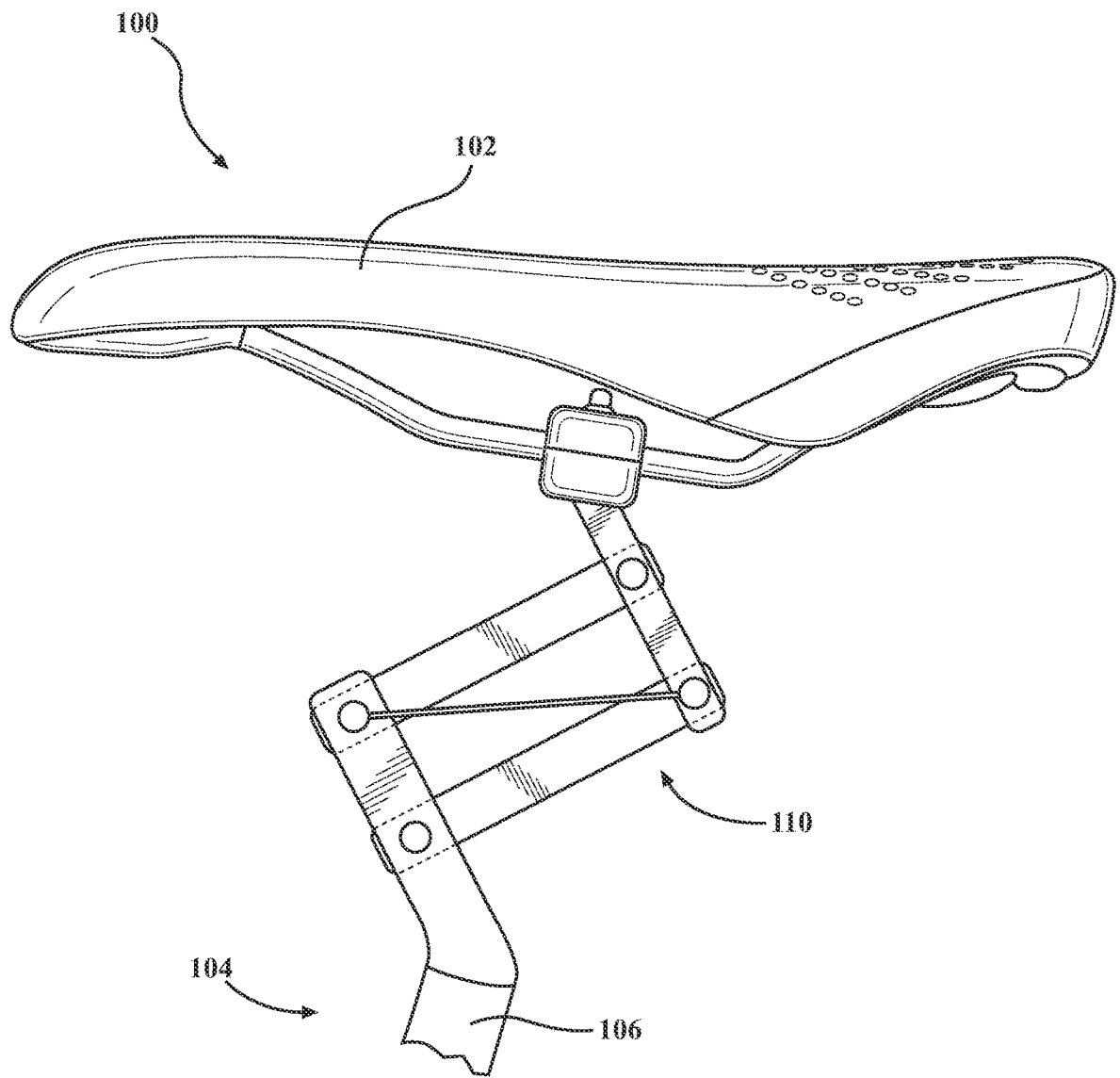
FIG. 1 is an example of a portion of a bicycle.

When in use, a bicycle may be driven over rough or otherwise non-smooth surfaces. As a result, vibrations may be transmitted to the bicycle seat or saddle. These vibrations can cause rider discomfort and/or reduce ride quality. According to arrangements described herein, a vibration isolator and a system can be configured to manage vibrations and/or forces that may be encountered during bicycle use.

The system can include a vibration isolator operatively connected to the bicycle saddle. The vibration isolator can be configured to exhibit a non-linear stiffness profile. The non-linear stiffness profile can include a region of quasi-zero stiffness. The vibration isolator can include one or more movable body members and one or more super elastic material members.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a portion of a bicycle 100 is shown. While arrangements described herein will be made with respect to a bicycle, it will be understood that arrangements described herein can be used in connection with various devices that include a seat or saddle. For instance, arrangements described herein can be used in connection with any powered or non-powered vehicle, including, for example, a unicycle, a motorcycle, or a tricycle.

The bicycle 100 can include a saddle 102, which may also be referred to as a seat. The saddle 102 can be designed to support a portion of a rider's body. The saddle 102 can provide cushioning and/or comfort to a user. The saddle 102 can be any type of saddle, now known or later developed.

The saddle 102 can be operatively connected to a frame 104 of the bicycle in any suitable manner, now known or later developed. In one or more arrangements, the saddle 102 can be operatively connected to a seat post 106. The seat post 106 can be a tubular structure. In some arrangements, at least a portion of the seat post 106 can be hollow. The term "operatively connected," as used throughout this description, can include direct or indirect connections, including connections without direct physical contact.

One or more vibration isolators 110 can be operatively positioned between the saddle 102 and the seat post 106. The vibration isolator(s) 110 can be operatively connected to the saddle 102 and/or the seat post 106. For instance, the vibration isolator(s) 110 can be operatively connected to the saddle 102 and/or the seat post 106 by one or more fasteners, one or more welds, one or more adhesives, and/or one or more forms of mechanical engagement, or any combination thereof. The vibration isolator(s) 110 can have various configurations, some of which will be described herein in connection with FIGS. 2 and 3. While one vibration isolator 110 is shown in these figures, it will be appreciated that there can be a plurality of vibration isolators 110, which can be arranged, for example, side-by-side to each other (e.g., into and/or out of the page in FIG. 2). As another alternative, the plurality of vibration isolators 110 can be arranged in series, such as being sequentially stacked upon one another.

Figure 2:
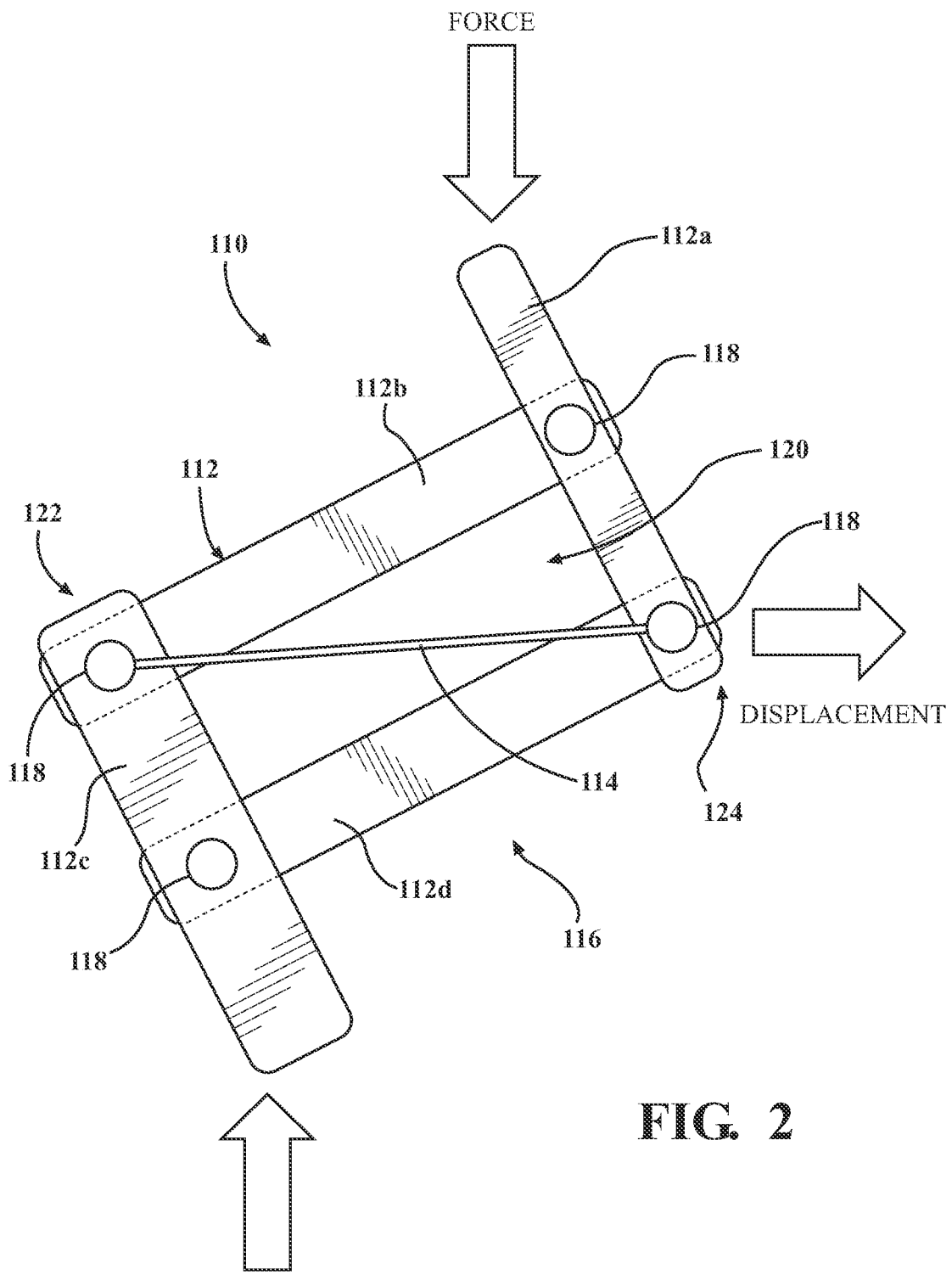
FIG. 2 is an example of a vibration isolator.

Referring to FIG. 2, one example of a vibration isolator 110 is shown. The vibration isolator 110 can be configured to exhibit a non-linear stiffness profile. The non-linear stiffness profile can include a region of quasi-zero stiffness. The vibration isolator 110 can be configured such that the non-linear stiffness profile can be selectively variable. The non-linear stiffness profile, and its selective variability, will be described later in this description.

The vibration isolator 110 can include one or more body members 112 and one or more super elastic material members 114. The one or more body members 112 can be movable. In one or more arrangements, the one or more body members 112 can include four body members 112a, 112b, 112c, 112d. The four body members 112a, 112b, 112c, 112d can be configured as a four-bar linkage 116. However, it will be appreciated that a four-bar linkage is merely one example of a configuration for the body members 112. Indeed, the body members 112 can form any constrained kinematic chain or linkage suitable for vibration isolation.

The one or more arrangements, the four body members 112a, 112b, 112c, 112d can be separate pieces that are subsequently operatively connected to each other. Any suitable form of operative connection can be used, including, for example, one or more welds, one or more fasteners, one or more adhesives, and/or one or more forms of mechanical engagement, or any combination thereof, just to name a few possibilities. In some arrangements, the body members 112 that intersect can be operatively connected by one or more fasteners 118. In some arrangements, the fasteners 118 can permit relative movement between the intersecting body members 112, such as relative pivoting or rotational movement. In one or more arrangements, the fasteners 118 can be screws, bolts, pins, rivets, connectors, or anchors, just to name a few possibilities. In some arrangements, the four body members 112a, 112b, 112c, 112d can be formed a single unitary structure.

The four-bar linkage 116 can have any suitable size, shape, and/or configuration. In one or more arrangements, the four-bar linkage 116 can be substantially rectangular, substantially square, substantially parallelogram, substantially trapezoid, substantially quadrilateral, substantially triangular, or substantially polygonal in confirmation. The four-bar linkage 116 can define an open interior space 120.

The body members 112a, 112b, 112c, 112d can have any suitable size, shape, and/or configuration. For instance, the body members 112a, 112b, 112c, 112d can be hollow, or the body members 112a, 112b, 112c, 112d be solid. In some arrangements, the body members 112a, 112b, 112c, 112d can be substantially rectangular, but it will be appreciated that other shapes are possible. The body members 112a, 112b, 112c, 112d can be substantially identical to each other, or one or more of the segments can be different from the other body members in one or more respects. The body members 112a, 112b, 112c, 112d can be made of any suitable material. In some arrangements, the body members 112a, 112b, 112c, 112d can be made of any suitable plastic, metal, or alloy, just to name a few possibilities.

As noted above, the vibration isolator 110 can include one or more super elastic material members 114. The super elastic material member(s) 114 can be made of any suitable super elastic material. One example of a super elastic material is AdrenaLine™, which is available from Miga Motor Company, Silverton, Oreg. Another example of a super elastic material is Furukawa Ni—Ti Alloy, which is available from Furukawa Techno Material Co., Ltd., Kanagawa, Japan. In other examples, the super elastic material member(s) 114 can be a shape memory alloy.

A super elastic material is a material that exhibits two primary properties under certain conditions: super elasticity and quasi-zero stiffness. These properties are depicted in the stress-strain curve 600 shown in FIG. 6. Super elasticity refers to the ability of the super elastic material to substantially regain its original shape when an applied stress, load, and/or force, is removed. For example, the super elastic recovery region 602 of the stress-strain curve 600 shows the super elastic material returning to a zero-stress state after unloading of an applied stress. Quasi-zero stiffness refers to a region of the stress-strain curve 600 for super elastic materials that is substantially flat. In the quasi-zero stiffness region 604 of the stress-strain curve 600, the stiffness becomes very low (for example, zero or substantially zero), which allows for good vibration isolation. When the super elastic material member(s) 114 operates in the quasi-zero stiffness region 604, the transfer of vibrations from the bicycle 100 to the saddle 102 can be substantially reduced. In this way, the super elastic material member(s) 114 can act as vibration isolators. The super elastic material member(s) 114 would exhibit a similar profile on a force-deflection curve. In the quasi-zero stiffness region, the force-deflection curve can become substantially flat.

While the super elastic material member(s) 114 can have any suitable form. For instance, the super elastic material member(s) 114 can take the form of wires, cables, tubes, and/or other structures, just to name a few examples. Additionally or alternatively, the super elastic material member(s) 114 may include an insulating coating.

There can be any suitable arrangement between the super elastic material member(s) 114 and the body members 112. FIG. 2 shows one example of such an arrangement. The super elastic material member(s) 114 can be operatively connected to a corner 122 of the four-bar linkage 116. The super elastic material member(s) 114 can extend across the four-bar linkage 116 to the substantially diagonally opposite corner 124. It will be understood that the arrangement shown in FIG. 2 is merely one example of a way in which the super elastic material member(s) 114 can be arranged in the vibration isolator 110. In other arrangements, the super elastic material member(s) 114 can extend substantially parallel to one or more of the body members 112a, 112b, 112c, 112d. In some arrangements, a plurality of super elastic material members 114 can extend in different directions, including directions that are non-parallel to each other.

The super elastic material member(s) 114 can be operatively connected to the body members 112 in any suitable manner, such as by one or more fasteners, one or more adhesives, one or more welds, and/or on or more forms of mechanical engagement, or any combination thereof. In some arrangements, the super elastic material members can be operatively connected to the fasteners 118 and/or to one or more of the body members 112a, 112b, 112c, 112d.

FIG. 2 shows an example of a non-activated configuration of the vibration isolator 110. In some arrangements, the super elastic material member(s) 114 can be pre-stretched to a quasi-zero stiffness region of the non-linear stiffness profile. In some arrangements, the super elastic material member(s) 114 can be stretched to a quasi-zero stiffness region of the non-linear stiffness profile when loaded (e.g., when a person sits on the saddle).

Figure 3:
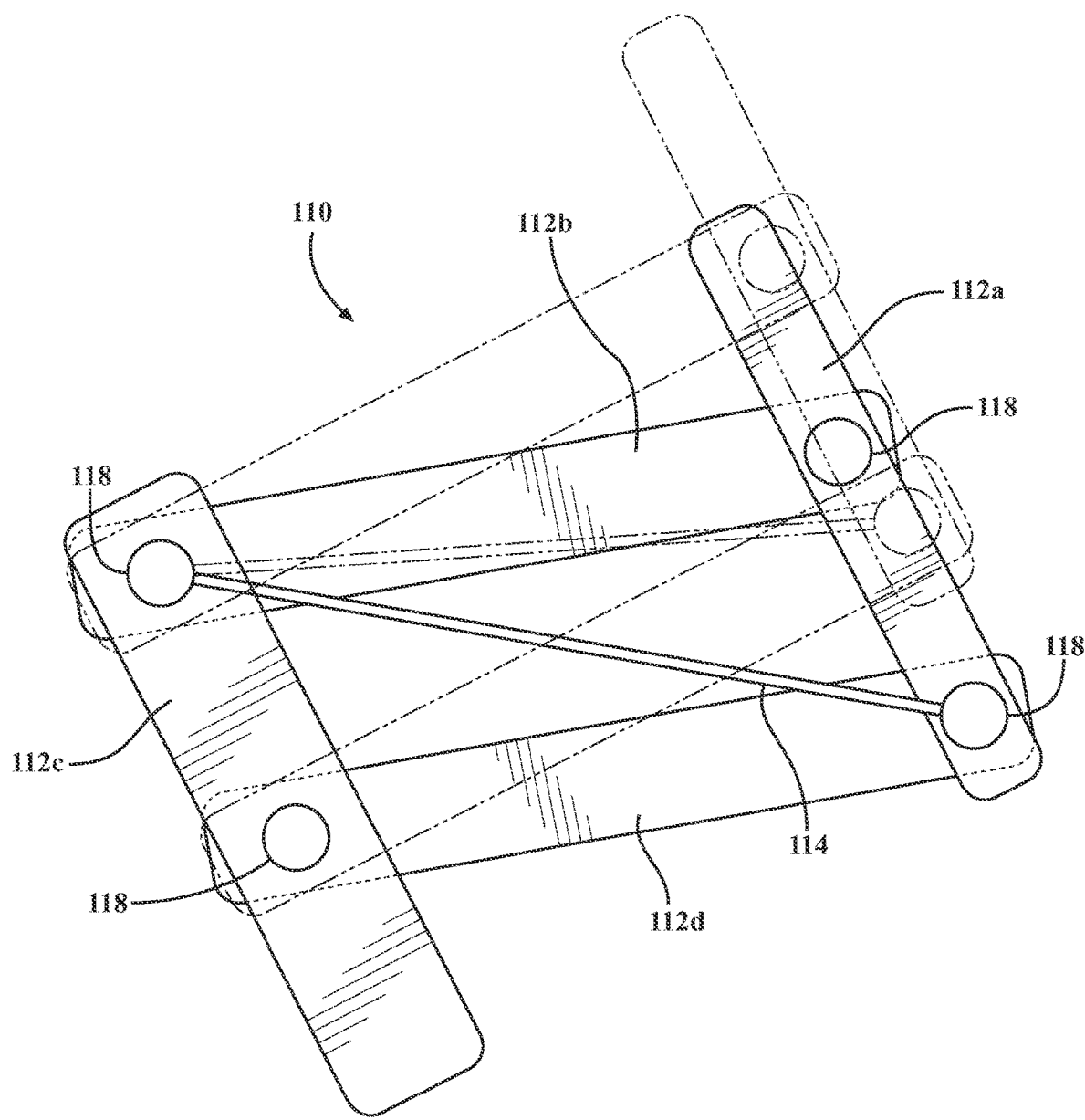
FIG. 3 shows an example of an activated configuration of the vibration isolator, the non-activated configuration being shown in dashed lines.

The vibration isolator(s) 110 can be subjected to forces from the saddle 102 and/or from the frame 104 of the bicycle 100. Such forces can directly or indirectly cause changes in the configuration of the vibration isolator(s) 110. Referring to FIG. 3, an activated configuration of the vibration isolator 110 is shown. Here, the super elastic material member(s) 114 has been activated (e.g., such as by stretching). The stretching of the super elastic material member(s) 114 can result from the movement of the four-bar linkage 116. The movement of the four-bar linkage 116 can be due to forces imparted on the vibration isolator 110. When the vibration isolator 110 is in an activated configuration, the super elastic material member(s) 114 can be in the quasi-zero stiffness region of the stiffness profile. As a result, good vibration isolation performance can be achieved.

In the arrangement shown in FIGS. 2-3, the four-bar linkage 116 can have a substantially rectangular configuration when in a non-activated configuration. In such case, the super elastic material member(s) 114 can have a first length. In the activated configuration, the four-bar linkage 116 can have a substantially non-rectangular, parallelogram configuration. The super elastic material member(s) 114 can have a second length. The second length can be greater than the first length.

Figure 4:
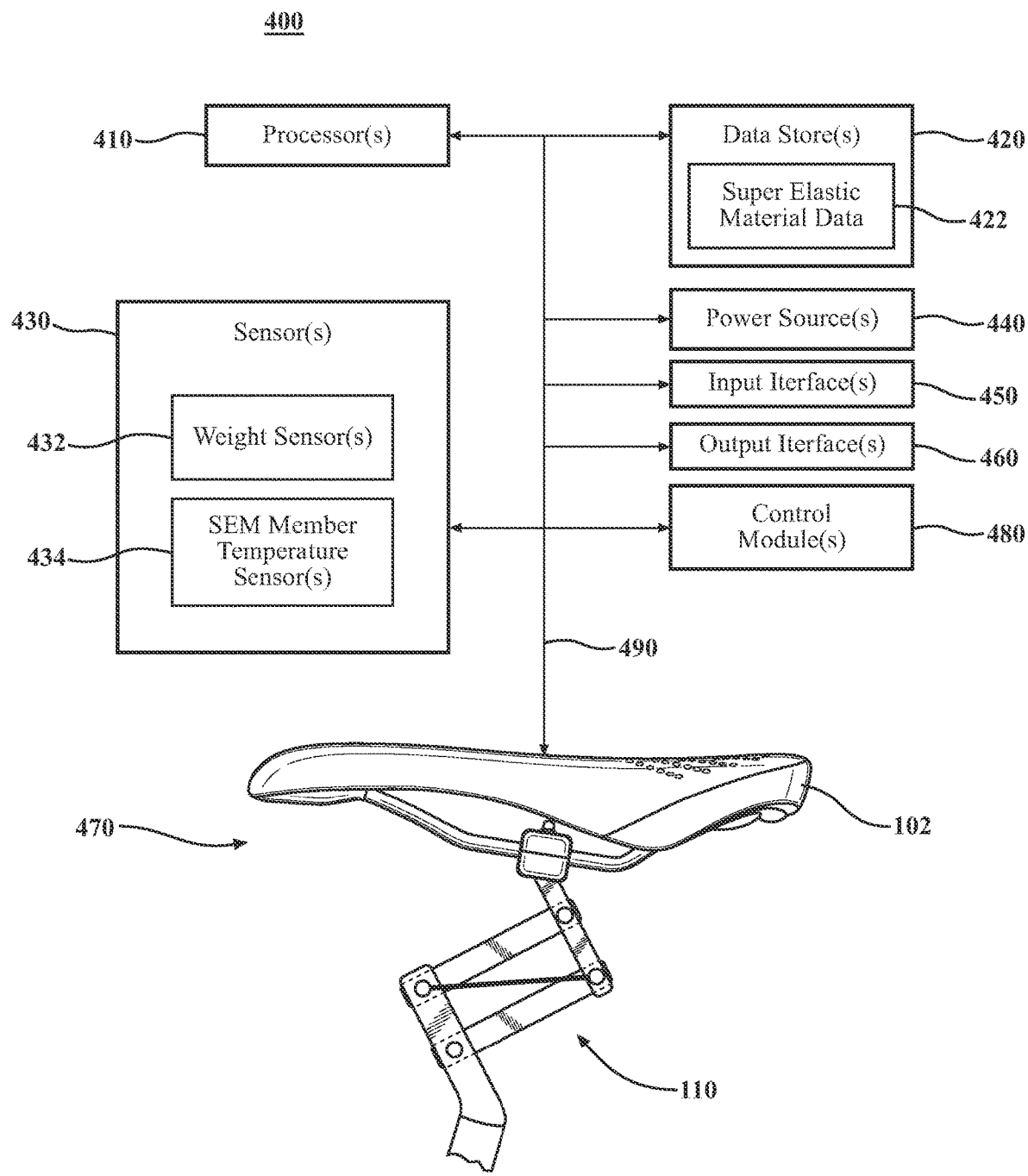
FIG. 4 is an example of a vibration isolation system for a bicycle saddle.

Referring to FIG. 4, an example of a system 400 for vibration isolation of a seat or saddle is shown. The system 400 can be used in connection with any type of seat or saddle, such as a bicycle seat or saddle.

The system 400 can include various elements. Some of the possible elements of the system 400 are shown in FIG. 4 and will now be described. It will be understood that it is not necessary for the system 400 to have all of the elements shown in FIG. 4 or described herein. The system 400 can have any combination of the various elements shown in FIG. 4. Further, the system 400 can have additional elements to those shown in FIG. 4. In some arrangements, the system 400 may not include one or more of the elements shown in FIG. 4.

The system 400 can include one or more processors 410, one or more data stores 420, one or more sensors 430, one or more power sources 440, one or more input interfaces 450, one or more output interfaces 460, a seat or saddle system 470, and one or more control modules 480. Each of these elements will be described in turn below.

As noted above, the system 400 can include one or more processors 410. "Processor" means any component or group of components that are configured to execute any of the processes described herein or any form of instructions to carry out such processes or cause such processes to be performed. The processor(s) 410 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 410 can include at least one hardware circuit (e.g., an integrated circuit) configured to carry out instructions contained in program code. In arrangements in which there is a plurality of processors 410, such processors can work independently from each other, or one or more processors can work in combination with each other.

The system 400 can include one or more data stores 420 for storing one or more types of data. The data store(s) 420 can include volatile and/or non-volatile memory. Examples of suitable data stores 420 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 420 can be a component of the processor(s) 410, or the data store(s) 420 can be operatively connected to the processor(s) 410 for use thereby.

In some arrangements, the data store(s) 420 can store super elastic material data 422 about one or more super elastic material members, including the super elastic material member(s) 114. As an example, the data store(s) 420 can store stress-strain curves for one or more super elastic material members, such as any of those used in the vibration isolator 110. For each super elastic material member, the stress-strain curves can show the performance of the respective super elastic material member at different temperatures.

Figure 5:
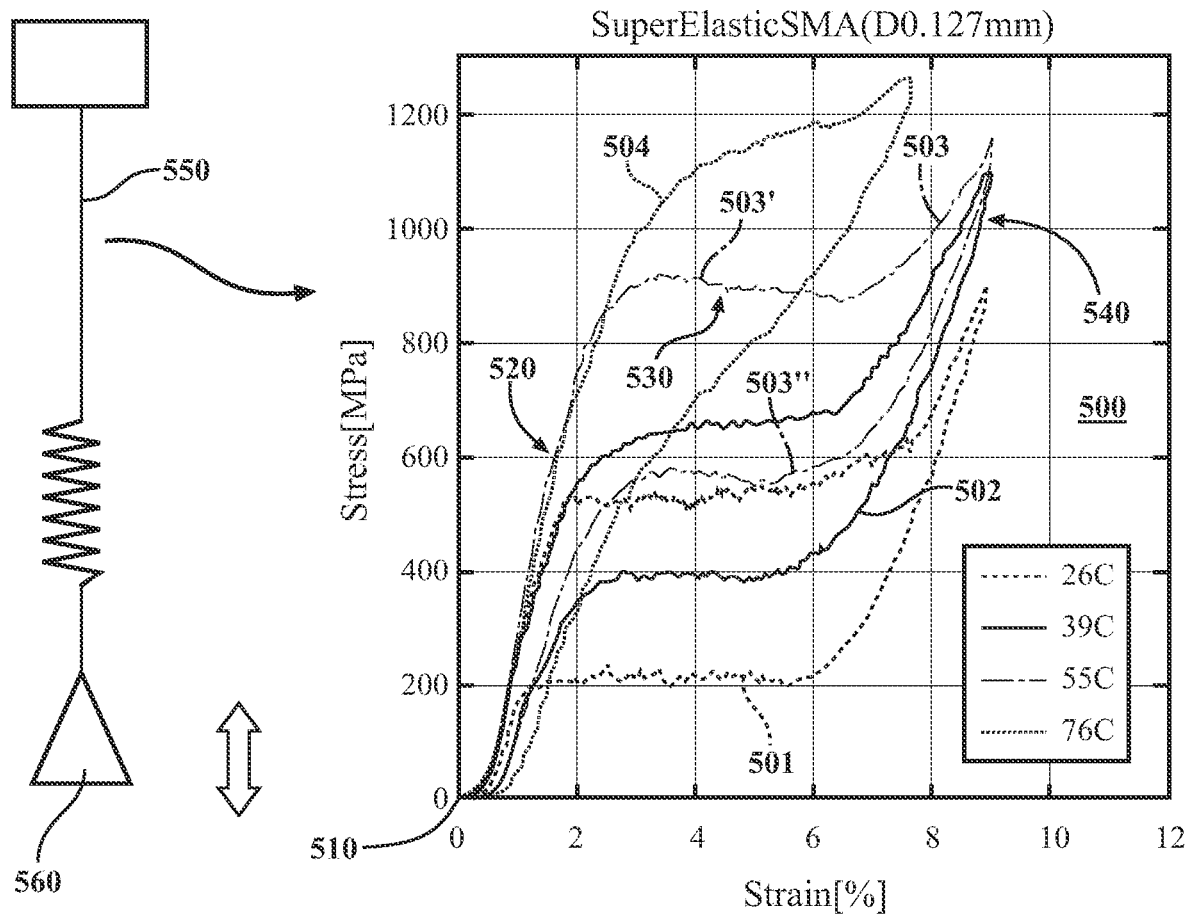
FIG. 5 is an example graph of stress-strain curves for a super elastic material member at different temperatures.
Figure 6:
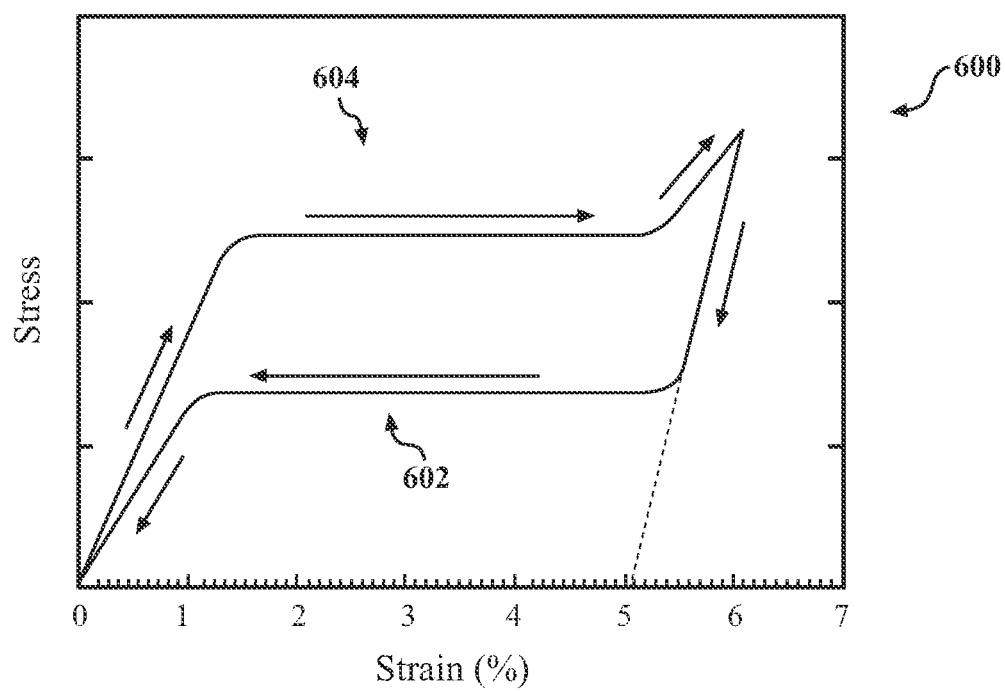
FIG. 6 is an example of a stress-strain curve for a super elastic material.

Referring to FIG. 5, a graph 500 showing example stress-strain curves for a super elastic material member is shown. The graph 500 can be for an example super elastic material member 550 under a load 560. The stress-strain curves can be at a plurality of different temperatures. In this example, stress-strain curves 501, 502, 503, 504 are shown for 26° C., 39° C., 55° C., and 76° C., respectively. It is noted that the graph 500 is merely an example, as the values will vary depending on various characteristics of each particular super elastic material member.

Stiffness of the super elastic material member can be temperature dependent. As a result, the stiffness characteristics of the super elastic material member can change with changes in temperature. The general shape of the stress-strain curves 501, 502, 503, 504 can represent the stiffness profile of the super elastic material member at different temperatures. As an example, the stress-strain curve 503 will be described. Starting from the origin 510, the super elastic material member can exhibit an initial stiffness region 520 that is substantially linear. The super elastic material member can be relatively stiff in the initial stiffness region 520. When load is reached, the stress-strain curve 503 can become zero or substantially zero, which can be referred to as a quasi-zero stiffness region 530. The quasi-zero stiffness region 530 can allow for good vibration isolation. Continuing beyond the quasi-zero stiffness region 530, the stress-strain curve 503 can have a subsequent stiffness region 540 that is substantially linear. The super elastic material member can be relatively stiff in the subsequent stiffness region 540.

The stress-strain curve 503 has a first portion 503' and a second portion 503". The first portion 503' represents the super elastic material member going from a non-loaded state to a loaded state. A second portion 503" represents the super elastic material member going from a loaded state to a non-loaded state.

It should be noted that, at each temperature, the super elastic material member can exhibit the quasi-zero stiffness region at a different stress level. Thus, the appropriate stiffness profile can be selected for the super elastic material member based on real-time loading conditions.

Further, it is noted that, at some temperature levels, the stiffness characteristics of the super elastic material member may not be as desirable because the quasi-zero stiffness region may be lost. As an example, the stress-strain curve 504 does not include a quasi-zero stiffness region. Thus, for the example super elastic material member shown in FIG. 5, it may not be desirable to heat the super elastic material member beyond 55° C.

The system 400 can include one or more sensors 430. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 400 includes a plurality of sensors 430, the sensors can work independently from each other. Alternatively, two or more of the sensors can work in combination with each other. In such case, the two or more sensors can form a sensor network. The sensor(s) 430 can be operatively connected to the processor(s) 410, the data store(s) 420, and/or other elements of the system 400 (including any of the elements shown in FIG. 4).

The sensor(s) 430 can include any suitable type of sensor. Various examples of different types of sensors will be described herein. However, it will be understood that the embodiments are not limited to the particular sensors described.

The sensor(s) 430 can include one or more weight sensors 432. The weight sensor(s) 432 can include any sensor, now known or later developed, configured to detect, determine, assess, monitor, measure, quantify and/or sense any information or data about a weight of an occupant of the saddle 102. The weight sensor(s) 432 can be located under the saddle 102. In one or more arrangements, the sensor(s) 430 can include one or more super elastic material member temperature sensors 434. The super elastic material member temperature sensor(s) 434 can be any sensor configured to detect, determine, assess, monitor, measure, quantify and/or sense the temperature of a super elastic material member, now known or later developed.

As noted above, the system 400 can include one or more power sources 440. The power source(s) 440 can be any power source capable of and/or configured to energize the super elastic material members, as will be described later. For example, the power source(s) 440 can include one or more batteries, one or more fuel cells, one or more generators, one or more alternators, one or more solar cells, and combinations thereof.

The system 400 can include one or more input interfaces 450. An "input interface" includes any device, component, system, element or arrangement or groups thereof that enable information/data to be entered into a machine. The input interface(s) 450 can receive an input from a person (e.g., a bicycle rider). Any suitable input interface 450 can be used, including, for example, a keypad, display, touch screen, multi-touch screen, switch, button, joystick, mouse, trackball, microphone and/or combinations thereof.

The system 400 can include one or more output interfaces 460. An "output interface" includes any device, component, system, element or arrangement or groups thereof that enable information/data to be presented to a person. The output interface(s) 460 can present information/data to a saddle occupant. The output interface(s) 460 can include a display, and earphone, and/or a speaker. Some components of the system 400 may serve as both a component of the input interface(s) 450 and a component of the output interface(s) 460.

The system 400 can include a set or saddle system 470. The saddle system 470 can include a seat or a saddle 102 and a vibration isolator 110. The above description of the saddle 102 and the vibration isolator 110 in connection with FIGS. 1-3 apply equally the same elements in the saddle system 470.

The system 400 can include one or more modules, at least some of which will be described herein. The modules can be implemented as computer readable program code that, when executed by a processor, implement one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, one or more data stores 420 may contain such instructions.

In one or more arrangements, the modules described herein can include artificial or computational intelligence elements, e.g., neural network, fuzzy logic, or other machine learning algorithms. Further, in one or more arrangements, the modules can be distributed among a plurality of modules. In one or more arrangements, two or more of the modules described herein can be combined into a single module.

The system 400 can include one or more control modules 480. The control module(s) 480 can include profiles and logic for actively controlling the stiffness characteristics of the super elastic material member(s) 114 of the vibration isolator 110. The control module(s) 480 can be configured to determine when the stiffness characteristics of the super elastic material member(s) 114 of the vibration isolator 110, such as the stiffness profile, should be adjusted. The control module(s) 480 can be configured to do so in any suitable manner. For instance, the control module(s) 480 can be configured to analyze data or information acquired by the sensor(s) 430 (e.g., the weight sensor(s) 432 and/or other sensors). The control module(s) 480 can retrieve raw data from the sensor(s) 430 and/or from the data store(s) 420. The control module(s) 480 can use profiles, parameters, or setting loaded into the control module(s) 480 and/or stored in the data store(s) 420, such as the super elastic material data 422. Alternatively or additionally, the control module(s) 480 can be configured to detect user inputs (e.g., commands) provided on the input interface(s) 450.

The control module(s) 480 can analyze the sensor data to determine an appropriate action for the super elastic material member(s) 114. The control module(s) 480 can be configured to cause the stiffness of the one or more super elastic material member(s) 114 to be adjusted. As used herein, "cause" or "causing" means to make, force, compel, direct, command, instruct, and/or enable an event or action to occur or at least be in a state where such event or action may occur, either in a direct or indirect manner. For instance, the control module(s) 480 can cause the super elastic material member(s) 114 to be selectively heated or cooled. As noted above, the stiffness of the super elastic material member(s) can be temperature dependent. The super elastic material member(s) 114 can be heated or cooled in any suitable manner, now known or later developed. For instance, super elastic material member(s) 114 can be heated by the Joule effect by passing electrical current through the super elastic material member(s) 114. To that end, the control module(s) 480 can be configured to selectively permit, restrict, adjust, alter, and/or prevent the flow of electrical energy from the power source(s) 440 to the one or more super elastic material member(s) 114 associated with the vibration isolator 110 operatively connected to the saddle 102. The control module(s) 480 can be configured send control signals or commands over a communication network 490 to the super elastic material member(s) 114 or to other elements of the system 400.

The control module(s) 480 can be configured to cause the stiffness characteristics of the super elastic material member(s) 114 associated with the vibration isolator 110 to be adjusted based on one or more parameters. For instance, the control module(s) 480 can be configured to cause the stiffness characteristics of the super elastic material member(s) 114 to be adjusted based on real-time conditions as detected by the sensor(s) 430, such as seat occupant weight. Based on such real-time conditions, the control module(s) 480 can determine suitable stiffness characteristics for the super elastic material member(s) 114. The control module(s) 480 can query the data store(s) 420 for data about the super elastic material member(s) 114. For instance, the control module(s) 480 can query the super elastic material data 422, such as the stress-strain curves for the super elastic material member(s) 114. The control module(s) 480 can be configured to select or determine a target temperature for the super elastic material member(s) 114 to achieve a desired stiffness characteristic. For instance, the target temperature can be based on one of the stress-strain curves, or it can be interpolated using the two stress-strain curves that bracket the desired stiffness characteristics.

Once a target temperature is selected, the control module(s) 480 can compare a current temperature of the super elastic material member(s) 114, as determined by the super elastic material member temperature sensor(s) 434, to the target temperature. If the super elastic material member(s) 114 need to be heated above their current temperature, then the control module(s) 480 can be configured to selectively permit or increase the flow of electrical energy from the power source(s) 440 to the super elastic material member(s) 114 associated with the vibration isolator 110. If the super elastic material member(s) 114 need to be cooled below their current temperature, then the control module(s) 480 can be configured to selectively decrease, restrict, or discontinue the flow of electrical energy from the power source(s) 440 to the super elastic material member(s) 114 associated with the vibration isolator 110. In some arrangements, the control module(s) 480 can be configured to activate a cooling source (e.g., a fan, a blower, a cooler, etc.) to facilitate the cooling of the super elastic material member(s) 114. If the current temperature of the super elastic material member(s) 114 is substantially equal to the target temperature, then the control module(s) 480 can take any suitable action with respect to the flow of electrical energy from the power source(s) 440 to the super elastic material member(s) 114 associated with the vibration isolator 110 so that the current temperature is maintained. The control module(s) 480 can be configured send control signals or commands over the communication network 490 to the super elastic material member(s) 114 or other elements of the system 400 or the vibration isolator 110.

The selective varying of the stiffness characteristics of the super elastic material member(s) 114 can be performed at any suitable time. For instance, the selective varying can be performed on a continuously, periodically, irregularly, or even randomly.

In some instances, the control module(s) 480 can be configured to cause the stiffness characteristics of the super elastic material member(s) 114 to be selectively adjusted based on user inputs (e.g., commands). For instance, a user can provide an input on the input interface(s) 450. The input can be to adjust the stiffness characteristics of the super elastic material member(s) 114. The control module(s) 480 can be configured to cause the stiffness characteristics of the super elastic material member(s) 114 to be adjusted in accordance with the user input.

When the vibration isolator includes a plurality of super elastic material members 114, the control module(s) 480 can be configured to control the stiffness characteristics of each super elastic material member 114 individually. Alternatively, the control module(s) 480 can be configured to control the stiffness characteristics of a plurality of super elastic material members 114 collectively. Thus, the stiffness characteristics of each super elastic material members 114 can be adjusted at substantially the same time, to the same degree of actuations, and/or in substantially the same manner.

The various elements of the system 400 can be communicatively linked to one another or one or more other elements through one or more communication networks 490. As used herein, the term "communicatively linked" can include direct or indirect connections through a communication channel, bus, pathway or another component or system. A "communication network" means one or more components designed to transmit and/or receive information from one source to another. The data store(s) 420 and/or one or more other elements of the system 400 can include and/or execute suitable communication software, which enables the various elements to communicate with each other through the communication network and perform the functions disclosed herein.

The one or more communication networks 490 can be implemented as, or include, without limitation, a wide area network (WAN), a local area network (LAN), the Public Switched Telephone Network (PSTN), a wireless network, a mobile network, a Virtual Private Network (VPN), the Internet, a hardwired communication bus, and/or one or more intranets. The communication network further can be implemented as or include one or more wireless networks, whether short range (e.g., a local wireless network built using a Bluetooth or one of the IEEE 802 wireless communication protocols, e.g., 802.11a/b/g/a, 802.15, 802.16, 802.20, Wi-Fi Protected Access (WPA), or WPA2) or long range (e.g., a mobile, cellular, and/or satellite-based wireless network; GSM, TDMA, CDMA, WCDMA networks or the like). The communication network can include wired communication links and/or wireless communication links. The communication network can include any combination of the above networks and/or other types of networks.

It will be appreciated that arrangements described herein can provide numerous benefits, including one or more of the benefits mentioned herein. For example, arrangements described herein can isolate the vibrations of a bicycle saddle. Arrangements described herein can improve rider comfort and/or ride quality. Arrangements described herein can allow for the adjustment of vibration isolation characteristics based on real-time conditions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC).

As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A system for vibration isolation of a bicycle saddle, the system comprising:
 a bicycle saddle; and
 a vibration isolator operatively connected to the bicycle saddle, the vibration isolator being configured to exhibit a non-linear stiffness profile, the non-linear stiffness profile including a region of quasi-zero stiffness, the vibration isolator including one or more movable body members and one or more super elastic material members, the one or more super elastic material members being pre-stretched to a quasi-zero stiffness region of the non-linear stiffness profile.

2. The system of claim 1, further including:
 one or more processors operatively connected to selectively vary the non-linear stiffness profile of the vibration isolator by controlling a temperature of the one or more super elastic material members.

3. The system of claim 2, further including:
 one or more power sources operatively connected to supply electrical energy to the one or more super elastic material members, wherein the one or more processors are operatively connected to the one or more power sources, wherein the one or more processors are configured to control the temperature of the one or more super elastic material members by controlling a supply of electrical energy to the one or more super elastic material members.

4. The system of claim 2, wherein the one or more processors are configured to selectively vary the non-linear stiffness profile of the one or more super elastic material members based on one or more real-time conditions.

5. The system of claim 1, wherein the one or more super elastic material members include a super elastic shape memory alloy.

6. The system of claim 1, wherein the one or more super elastic material members are cables or wires.

7. The system of claim 1, wherein the one or more movable body members are configured as a four-bar linkage.

8. The system of claim 7, wherein the one or more super elastic material members extend diagonally across the four-bar linkage.

9. The system of claim 7, wherein the four-bar linkage has a substantially rectangular configuration when in a non-activated condition, and wherein the one or more super elastic material members have a first length.

10. The system of claim 9, wherein the four-bar linkage has a substantially non-rectangular parallelogram configuration when in an activated condition, wherein the one or more super elastic material members have a second length, and wherein the second length is greater than the first length.

11. A system for vibration isolation of a bicycle saddle, the system comprising:
 a bicycle saddle;
 a vibration isolator operatively connected to the bicycle saddle, the vibration isolator being configured to exhibit a non-linear stiffness profile, the non-linear stiffness profile including a region of quasi-zero stiffness, the vibration isolator including one or more movable body members and one or more super elastic material members;
 one or more processors operatively connected to selectively vary the non-linear stiffness profile of the vibration isolator by controlling a temperature of the one or more super elastic material members;
 one or more power sources operatively connected to supply electrical energy to the one or more super elastic material members, the one or more processors being operatively connected to the one or more power sources, the one or more processors being configured to control the temperature of the one or more super elastic material members by controlling a supply of electrical energy to the one or more super elastic material members; and
 one or more sensors operatively connected to the one or more processors, the one or more sensors being configured to acquire sensor data about a current temperature of the one or more super elastic material members, and the one or more processors being configured to:
  compare the current temperature of the one or more super elastic material members to a target temperature for the one or more super elastic material members to achieve a target stiffness profile for the one or more super elastic material members; and
  when the current temperature of the one or more super elastic material members is different than the target temperature for the one or more super elastic material members, cause the supply of electrical energy to the one or more super elastic material members to be adjusted.

12. The system of claim 11, wherein the one or more super elastic material members are configured to be stretched to a quasi-zero stiffness region of the non-linear stiffness profile when a person sits on the bicycle saddle.

13. A system for vibration isolation of a bicycle saddle, the system comprising:
 a bicycle saddle;
 a vibration isolator operatively connected to the bicycle saddle, the vibration isolator being configured to exhibit a non-linear stiffness profile, the non-linear stiffness profile including a region of quasi-zero stiffness, the vibration isolator including one or more movable body members and one or more super elastic material members
 one or more processors operatively connected to selectively vary the non-linear stiffness profile of the vibration isolator by controlling a temperature of the one or more super elastic material members, the one or more processors are configured to selectively vary the non-linear stiffness profile of the one or more super elastic material members based on one or more real-time conditions; and
 one or more sensors operatively connected to the one or more processors, the one or more sensors being operatively connected to the bicycle saddle, the one or more sensors being configured to acquire sensor data about at least one of a weight of an occupant of the bicycle saddle, and the one or more real-time conditions including a weight of an occupant of the bicycle saddle.

14. The system of claim 13, wherein the one or more super elastic material members are configured to be stretched to a quasi-zero stiffness region of the non-linear stiffness profile when a person sits on the bicycle saddle.

15. A vibration isolator comprising:
a four-bar linkage; and
one or more super elastic material members operatively connected to the four-bar linkage, the one or more super elastic material members being configured to exhibit a non-linear stiffness profile, the non-linear stiffness profile including a region of quasi-zero stiffness, the non-linear stiffness profile being selectively variable, the one or more super elastic material members being pre-stretched to a quasi-zero stiffness region of the non-linear stiffness profile.

16. The vibration isolator of claim 15, wherein the one or more super elastic material members include a super elastic shape memory alloy.

17. The vibration isolator of claim 15, wherein the one or more super elastic material members are cables or wires.

18. The vibration isolator of claim 15, wherein the four-bar linkage has a substantially rectangular configuration when in a non-activated configuration, wherein the one or more super elastic material members have a first length in a non-activated configuration, wherein the four-bar linkage has a substantially non-rectangular parallelogram configuration when in an activated configuration, wherein the one or more super elastic material members have a second length in the activated configuration, and wherein the second length is greater than the first length.

19. A vibration isolator comprising:
a four-bar linkage;
one or more super elastic material members operatively connected to the four-bar linkage, the one or more super elastic material members being configured to exhibit a non-linear stiffness profile, the non-linear stiffness profile including a region of quasi-zero stiffness, the non-linear stiffness profile being selectively variable;
one or more processors operatively connected to selectively vary the non-linear stiffness profile of the vibration isolator by controlling a temperature of the one or more super elastic material members;
one or more power sources operatively connected to supply electrical energy to the one or more super elastic material members, the one or more processors being operatively connected to the one or more power sources, the one or more processors being configured to control the temperature of the one or more super elastic material members by controlling a supply of electrical energy to the one or more super elastic material members; and
one or more sensors operatively connected to the one or more processors, the one or more sensors being configured to acquire sensor data about a current temperature of the one or more super elastic material members, and the one or more processors being configured to:
compare the current temperature of the one or more super elastic material members to a target temperature for the one or more super elastic material members to achieve a target stiffness profile for the one or more super elastic material members; and
when the current temperature of the one or more super elastic material members is different than the target temperature for the one or more super elastic material members, cause the supply of electrical energy to the one or more super elastic material members to be adjusted.

20. The vibration isolator of claim 19, wherein the one or more super elastic material members are configured to be stretched to a quasi-zero stiffness region of the non-linear stiffness profile when a person sits on a bicycle saddle.

21. A vibration isolator comprising:
a four-bar linkage;
one or more super elastic material members operatively connected to the four-bar linkage, the one or more super elastic material members being configured to exhibit a non-linear stiffness profile, the non-linear stiffness profile including a region of quasi-zero stiffness, the non-linear stiffness profile being selectively variable;
one or more processors operatively connected to selectively vary the non-linear stiffness profile of the vibration isolator by controlling a temperature of the one or more super elastic material members, the one or more processors being configured to selectively vary the non-linear stiffness profile of the one or more super elastic material members based on one or more real-time conditions; and
one or more sensors operatively connected to the one or more processors, the one or more sensors being operatively connected to a bicycle saddle, the one or more sensors being configured to acquire sensor data about at least one of a weight of an occupant of the bicycle saddle, and the one or more real-time conditions including a weight of an occupant of the bicycle saddle.

22. The vibration isolator of claim 21, wherein the one or more super elastic material members are configured to be stretched to a quasi-zero stiffness region of the non-linear stiffness profile when a person sits on the bicycle saddle.

* * * * *